United States Patent
Adams et al.

(10) Patent No.: US 6,876,642 B1
(45) Date of Patent: Apr. 5, 2005

(54) IN-VEHICLE WIRELESS LOCAL AREA NETWORK

(75) Inventors: Jay James Adams, Noblesville, IN (US); Ronald Kent Reger, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/538,589

(22) Filed: Mar. 27, 2000

(51) Int. Cl.$^7$ .................... H04L 12/28; H04Q 7/20
(52) U.S. Cl. ................ 370/338; 370/402; 370/425; 307/10.1; 455/437
(58) Field of Search ................... 370/254, 257, 370/312, 321, 325, 329, 336, 337, 338, 345, 347, 357, 360, 362, 401, 402, 407, 422, 425; 307/10.1, 11, 29, 36, 38; 379/88.13, 88.17; 455/422, 426, 432.1, 437, 446, 448, 449, 450, 451, 452; 701/23, 24, 29, 33

(56) References Cited

U.S. PATENT DOCUMENTS

| | | | | |
|---|---|---|---|---|
| 5,796,727 A | * | 8/1998 | Harrison et al. | 370/338 |
| 5,949,776 A | * | 9/1999 | Mahany et al. | 370/338 |
| 5,960,074 A | * | 9/1999 | Clark | 379/310 |
| 6,148,193 A | * | 11/2000 | Miska et al. | 455/410 |
| 6,243,581 B1 | * | 6/2001 | Jawanda | 455/432 |
| 6,362,730 B2 | * | 3/2002 | Razavi et al. | 340/438 |
| 6,421,791 B1 | | 7/2002 | Cocco et al. | 714/31 |
| 6,445,777 B1 | * | 9/2002 | Clark | 379/88.13 |
| 6,466,655 B1 | * | 10/2002 | Clark | 379/88.13 |
| 6,539,358 B1 | | 3/2003 | Coon et al. | 704/275 |
| 6,560,222 B1 | * | 5/2003 | Pounds et al. | 370/353 |

* cited by examiner

Primary Examiner—Alpus H. Hsu
(74) Attorney, Agent, or Firm—Stefan V. Chmielewski

(57) ABSTRACT

A wireless local area network communication system for a vehicle to provide a voice and/or data connection from a wireless wide area network to a wireless local area network and on to a vehicle wired bus is disclosed. The communication system includes a wireless electronic communication device disposed in or in proximity to the vehicle for communication with the wireless wide area network, a wireless local area network unit disposed in the vehicle in such a manner as to communicate with the wireless electronic communication device and with a wired vehicle bus disposed within the vehicle, and a plurality of electronic devices disposed in or in proximity to the vehicle and in communication with the local area network unit or the wireless electronic communication device.

6 Claims, 3 Drawing Sheets

IN-VEHICLE WIRELESS LOCAL AREA NETWORK

BACKGROUND OF THE INVENTION

1. Field of the Invention

The present invention relates to local area networks (LANs) generally and, more particularly, to a novel wireless local area network (WLAN) for use in vehicles that reduces the hard wiring of electronic devices in the vehicle, while maintaining access to messages on the vehicle bus.

2. Background Art

WLANs, which typically provide communications via a radio frequency network, are widely used in offices, for example, to wirelessly interconnect a number of pieces of electronic equipment such as computers and facsimile transmitters/receivers. Such an arrangement eliminates the need to hard wire such components and provides flexibility in that the pieces of electronic equipment can be easily relocated to different locations around the premises by simply moving the equipment, without having to perform any rewiring.

As cellular telephones, pagers, and other electronic equipment have become more and more numerous, the use thereof in vehicles has become more and more common. Typically, such items are connected via radio frequency to a wireless wide area network (WWAN) which provides radio frequency communications via satellite and/or terrestrial antennas. When the cellular telephones or pagers are located in a vehicle, they are hard wired to a vehicle bus originating in the AM/FM radio head control unit, or any other electronic module in the vehicle, the cellular telephones or pagers communicating via radio frequency with the WWAN. Such an arrangement adds cost to the vehicle and reduces flexibility in that the hard wired components cannot be easily relocated within the vehicle, used in proximity to the vehicle, or used away from the vehicle.

Some other "wireless" communication systems of various types include the following:

At least one bus system uses a WWAN function to transmit voice and data communications to a fixed roadside reader. The roadside reader communicates over a WLAN with an in-vehicle wireless transmit/receive unit (TRU) that is connected to the vehicle bus. The roadside reader is not mobile and does not have the capability to communicate inside and outside of the vehicle. Remote keyless entry devices provide data communication to the vehicle mounted TRU by way of a WLAN. The TRU provides a gateway that distributes the data over various wired vehicle busses. The system does not communicate with a WWAN.

In-vehicle cellular telephone systems have used dummy handsets that employ radio frequency and/or infrared to connect from a dummy handset to the TRU. While these systems have a WLAN, they have the WLAN TRU fixed or embedded in the vehicle and it cannot be used outside the vehicle. Furthermore, in the case of infrared, the system cannot interface with multiple devices on the WLAN and is very line-of-sight and directional in the connectivity to the infrared sensors.

None of the foregoing systems provides an in-vehicle WLAN to interconnect electronic devices in a vehicle.

Accordingly, it is a principal object of the present invention to provide a WLAN for in-vehicle communications with electronic devices.

It is a further object of the invention to provide such a WLAN that eliminates or reduces the amount of hard wiring required to interconnect such devices.

It is another object of the invention to provide a voice and/or data connection from the WWAN to the WLAN and on to the vehicle wired bus.

It is an additional object of the invention to provide such a WLAN that is easily and economically implemented.

Other objects of the invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a wireless local area network communication system for a vehicle to provide a voice and/or data connection from a wireless wide area network to a wireless local area network and on to a vehicle wired bus, said communication system comprising: a wireless electronic communication device disposed in or in proximity to said vehicle for communication with said wireless wide area network; a wireless local area network unit disposed in said vehicle in such a manner as to communicate with said wireless electronic communication device and with a wired vehicle bus disposed within said vehicle; and a plurality of electronic devices disposed in or in proximity to said vehicle and in communication with said wireless local area network unit or said wireless electronic communication device.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
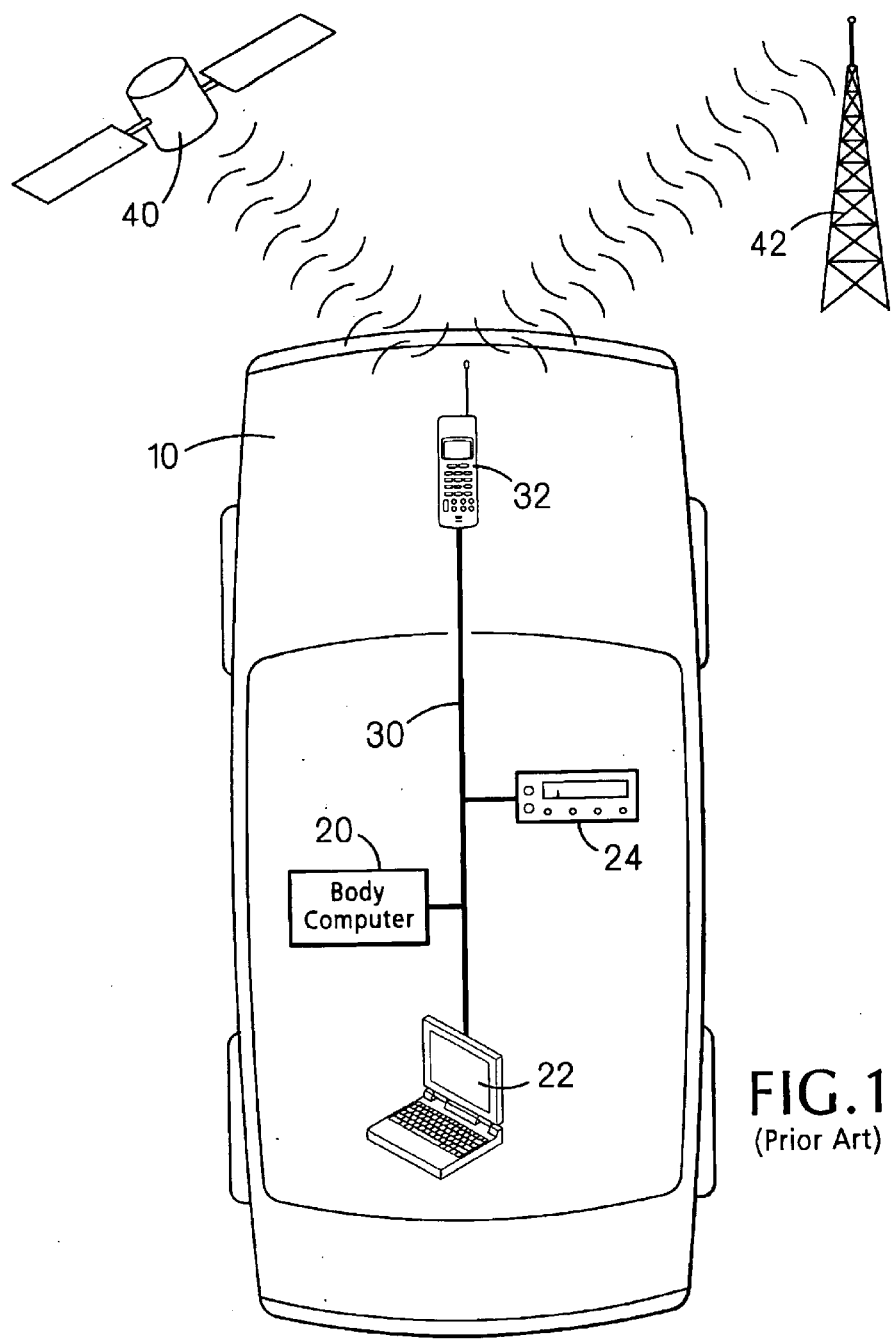
FIG. 1 is a schematic plan view of a vehicle having therein hard wired electronic devices that communicate with a WWAN through an in-vehicle portable telephone.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a vehicle 10 in which is a conventional LAN connecting electronic devices. The electronic devices, shown here for illustrative purposes only, are a vehicle body computer 20, a laptop computer 22, and an AM/FM radio receiver 24. It will be understood that any number of electronic devices may be accommodated in a similar manner in vehicle 10. Electronic devices 20, 22, and 24 are connected via a hard wired bus 30 to a portable cellular telephone 32. In-vehicle portable cellular telephone 32 communicates via radio frequency to and from a satellite 40 or a terrestrial antenna 42 that are part of a WWAN. It will be understood that installing hard wired bus 30 in vehicle 10 adds cost to the vehicle and also limits the degree to which electronic devices 20, 22, and 24 may be relocated within the vehicle or used outside the vehicle.

Figure 2:
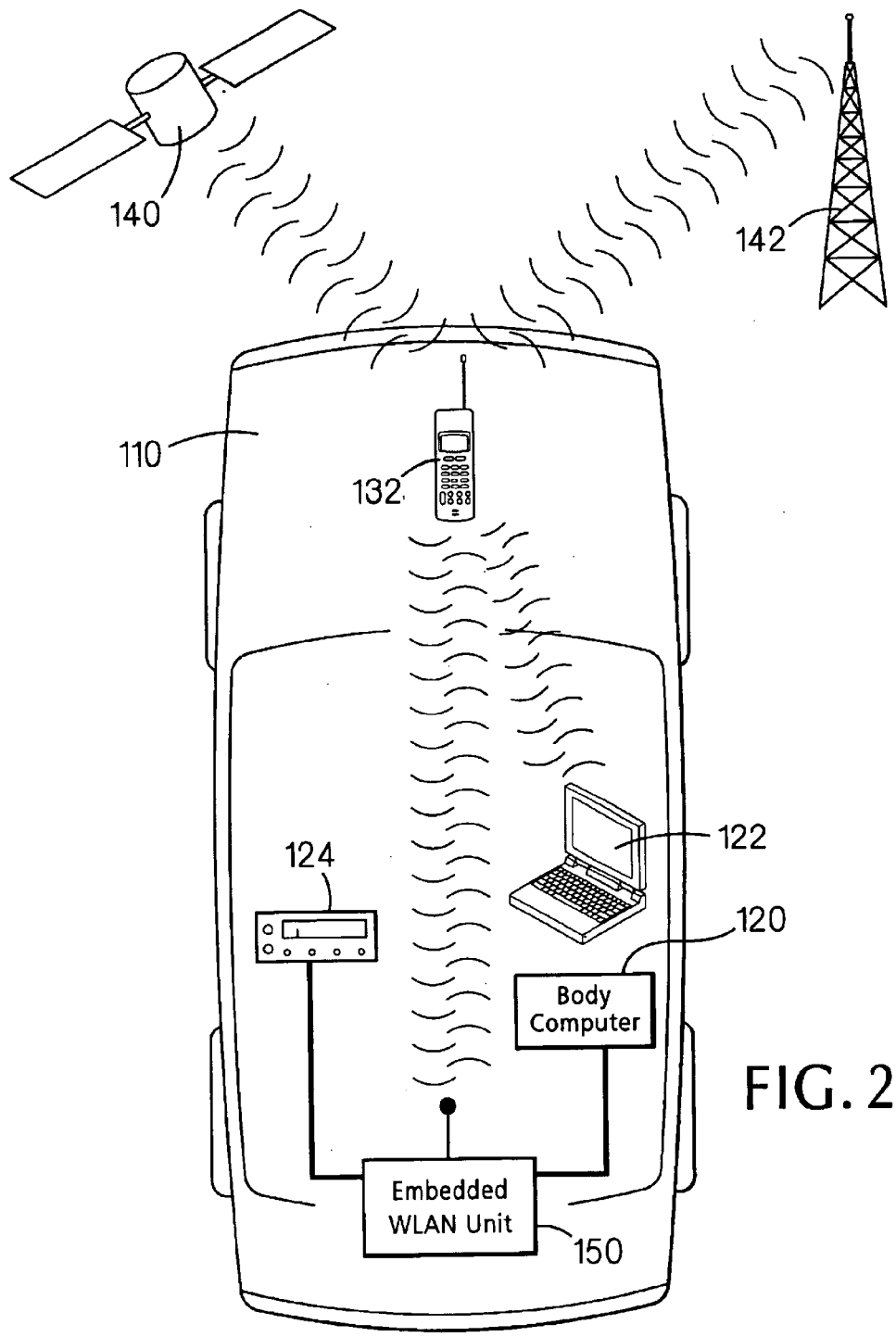
FIG. 2 is a schematic plan view of a vehicle having therein electronic components interconnected by means of a vehicle bus and a WLAN and that communicate with a WWAN through an in-vehicle cellular telephone.

FIG. 2 illustrates a vehicle 110 in which there is a WLAN, according to the present invention, connecting electronic devices. The electronic devices shown here, for illustrative purposes only, are a vehicle body computer 120, a laptop computer 122, and an AM/FM radio receiver 124. It will be understood that any number of electronic devices may be provided in a similar manner in vehicle 110. Laptop computer 122 may also be a personal digital assistant, or palm computer, or a hand-held personal computer.

Laptop computer 122 communicates via radio frequency in the WLAN with a portable cellular telephone 132 which communicates via radio frequency to and from a satellite 140 or a terrestrial antenna 142 that are part of a WWAN. Portable cellular telephone 132 is of a known type that includes second, low-power transmit/receive circuitry therein that permits simultaneously transmission and reception of RF signals.

Vehicle body computer 120 and AM/FM radio receiver 124 are shown as being hard wired to a first in-vehicle embedded wireless local are network (EWLAN) unit 150 that communicates via the WLAN with portable cellular telephone 132, although those electronic devices could also have their own EWLANs, if desired, to communicate directly with portable cellular telephone 132. Also, portable computer 122 could be hard wired to EWLAN is 150.

It will be understood that any other or additional electronic devices may be included in vehicle 110 either hard wired to EWLAN 150 or provided as part of the WLAN to communicate directly with cellular telephone 132.

Figure 3:
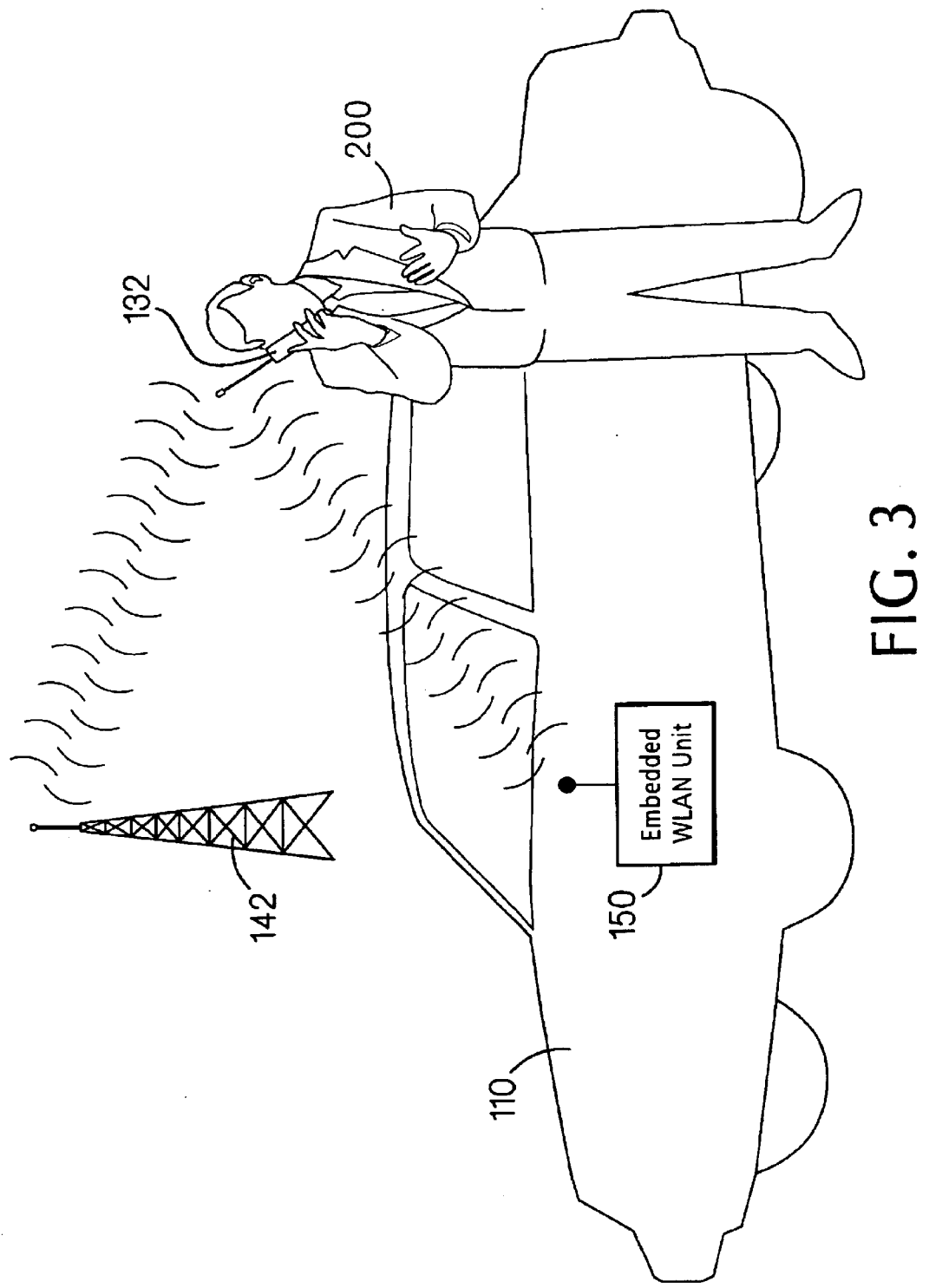
FIG. 3 is an isometric view of a person using a cellular telephone in proximity to a vehicle employing the present invention.

FIG. 3 illustrates a person 200 standing in proximity to vehicle 110 and using cellular telephone 132 to communicate with the WWAN (FIG. 2) via first in-vehicle EWLAN 150 and/or with terrestrial antenna 142, for example. In a like manner, any electronic device with a TRU can communicate with the WWAN provided that the electronic device is within the range of the WLAN. The communication of cellular telephone 132 with EWLAN 150 may involve unlocking doors of vehicle 110 or performing vehicle diagnostics via body computer 120 (FIG. 2.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like when used herein refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. A wireless local area network communication system for a vehicle to provide a voice an/or data connection from a wireless wide area network to a wireless local area network and on to a vehicle wired bus, said communication system comprising:

(a) a wireless electronic communication device disposed in or in proximity to said vehicle for communication with said wireless wide area network;

(b) a wireless local area network unit disposed in said vehicle in such a manner as to communication with said wireless electronic communication device and with a wired vehicle bus disposed within said vehicle; and (c) a plurality of electronic devices disposed in or in proximity to said vehicle and in communication with said wireless local area unit or said wireless electronic communication device.

2. A wireless local area network communication system for a vehicle, as defined in claim 1, wherein: at lest one of said plurality of electronic devices is in wired communication with said wireless local area network unit.

3. A wireless local area network communication system for a vehicle, as defined in claim 1, wherein said plurality of electronic devices is selected from the group consisting of: a pager, a laptop computer, a radio receiver, a body computer, and a facsimile transmitter/receiver.

4. A wireless local area network communication system for a vehicle, as defined in claim 1, wherein: said plurality of electronic devices is disposed of within said vehicle.

5. A wireless local area network communication system for a vehicle, as defined in claim 1, wherein: said wireless electronic communication device can be disposed of outside said vehicle.

6. A wireless local area network communication system for a vehicle to provide a voice and/or data connection from a wireless wide area network to a wireless local area network and onto a vehicle wired bus, said communication system comprising:

a wireless electronic communication device disposed in or in proximity to said vehicle for communication with said wireless wide area network;

a wireless local are network unit disposed in said vehicle in such a manner as to communicate with said wireless electronic communication device and with a wired vehicle bus disposed within said vehicle;

a plurality of electronic devices disposed in said vehicle and in communication with said wireless local area unit or said wireless electronic communication device, said plurality of electric devices is selected from the group consisting of a pager, a laptop compute, a radio receiver, a body computer, and a facsimile transmitter/receiver;

at least one of said plurality of electronic devices is disposed within said vehicle and is in wired communication with said wireless local area network unit; and a remainder of aid plurality of electronic devices are in wireless communication with said wireless local area network unit.

* * * * *